(12) United States Patent
Verner et al.

(10) Patent No.: US 10,358,954 B2
(45) Date of Patent: Jul. 23, 2019

(54) METHOD OF NOISE FILTERING A SLIDING CAMSHAFT ACTUATOR PIN POSITION OUTPUT SIGNAL

(71) Applicant: GM GLOBAL TECHNOLOGY OPERATIONS LLC, Detroit, MI (US)

(72) Inventors: Douglas R. Verner, Sterling Heights, MI (US); Timothy Karnjate, Grand Blanc, MI (US); Timothy P Philippart, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 15/585,463

(22) Filed: May 3, 2017

(65) Prior Publication Data

US 2018/0320565 A1 Nov. 8, 2018

(51) Int. Cl.
*G01M 15/04* (2006.01)
*F01L 13/00* (2006.01)
*G01D 5/14* (2006.01)
*G01D 3/032* (2006.01)
*F01L 1/053* (2006.01)
*F01L 1/18* (2006.01)

(52) U.S. Cl.
CPC .......... *F01L 13/0036* (2013.01); *F01L 1/053* (2013.01); *G01D 3/032* (2013.01); *G01D 5/142* (2013.01); *F01L 1/185* (2013.01); *F01L 2001/0537* (2013.01); *F01L 2013/0052* (2013.01); *F01L 2013/101* (2013.01); *F01L 2013/111* (2013.01); *F01L 2105/00* (2013.01); *F01L 2820/041* (2013.01)

(58) Field of Classification Search
USPC ........................................ 73/114.77, 114.79
See application file for complete search history.

(56) References Cited

U.S. PATENT DOCUMENTS

| | | | |
|---|---|---|---|
| 2012/0255509 A1* | 10/2012 | Lichti | F01L 1/3442 123/90.15 |
| 2014/0303873 A1* | 10/2014 | Glugla | F01L 13/0036 701/103 |
| 2015/0233272 A1* | 8/2015 | Moon | F01L 13/0042 123/90.18 |
| 2016/0237863 A1* | 8/2016 | Cecur | F01L 13/00 |
| 2017/0122224 A1* | 5/2017 | Hayden | F02D 13/0211 |
| 2017/0152772 A1* | 6/2017 | Choi | F01L 1/053 |
| 2018/0094554 A1* | 4/2018 | Kaan | F01L 13/0036 |
| 2018/0100414 A1* | 4/2018 | Gallon | F01L 1/047 |
| 2018/0100452 A1* | 4/2018 | Ryu | F01L 1/34 |
| 2018/0100453 A1* | 4/2018 | Ryu | F01L 13/0015 |
| 2018/0258803 A1* | 9/2018 | Verner | F01L 13/0042 |
| 2018/0283227 A1* | 10/2018 | Douglas | F01L 13/0036 |

(Continued)

*Primary Examiner* — Eric S. McCall

(57) ABSTRACT

A method of noise filtering a sliding camshaft actuator pin position output signal includes determining an actual pin position output signal period of a sliding camshaft actuator that occurs within a predetermined output signal period measurement window and establishing a pin position output signal filter window based on the actual pin position output signal period. Thereafter, the actual pin position output signal period from the sliding camshaft actuator is monitored by a control module and signals that occur outside of the pin position output signal filter window are rejected accordingly to prevent responding to false triggers.

20 Claims, 3 Drawing Sheets

(56) References Cited

U.S. PATENT DOCUMENTS

2018/0283236 A1* 10/2018 Verner ................ F01L 13/0036
2018/0340484 A1* 11/2018 Stewart ................... F02D 13/06
2019/0003446 A1*  1/2019 Philippart ............... F02D 41/22
2019/0072009 A1*  3/2019 Dietrich .............. F01L 13/0036

* cited by examiner

METHOD OF NOISE FILTERING A SLIDING CAMSHAFT ACTUATOR PIN POSITION OUTPUT SIGNAL

TECHNICAL FIELD

The present invention generally relates to sliding camshaft actuators for variable valve lift (VVL) systems and, more particularly, relates to a method of noise filtering a sliding camshaft actuator pin position output signal.

BACKGROUND

Internal combustion engines include intake and exhaust valves that can be actuated by cam lobes of at least one camshaft. In some configurations the camshafts are constructed with sliding camshaft assemblies having multiple steps for varying the lift distance of an engine valve. For example, a two-step sliding camshaft may include a high lift cam lobe position for lifting an engine valve to a maximum distance, and a low lift cam lobe position for lifting the engine valve below the maximum lift distance.

At least one sliding camshaft actuator is fixed on an internal combustion engine for changing position between the multiple cam lobes. Particularly, at least one actuator pin of a camshaft actuator is operative to selectively engage displacement grooves configured on the periphery of camshaft barrels formed on the sliding camshaft assembly. As the camshaft assembly rotates, an actuator pin is selected to move into a displacement groove of the camshaft barrel which causes the sliding camshaft assembly to shift into a different position along the camshaft axis. When a sliding camshaft shifts position, the intake and/or exhaust valves are actuated differently in accordance with the changed cam lobe position, e.g., a sliding camshaft may move from a high lift cam lobe position to a low lift cam lobe position, which in turn will cause the engine operation to be different.

Thus, the sliding camshaft actuator is an important component in the proper operation of a VVL sliding camshaft system, particularly the actuator's pin position relative to extending into, and retracting from, the displacement grooves into the camshaft barrels. The actuator's pin position is tracked by a sensing device which outputs a digital signal indicative of the pin position, e.g., a signal output transition from LOW to HIGH is indicative of an extended pin position, and a signal transition from HIGH to LOW is indicative of a retracted pin position. Monitoring the pin position sensor output signal allows the engine controller to determine if the camshaft actuator is responding properly to its commands to actuate the pin(s) for changing variable valve lift status.

It is appreciated that output signals from sensing devices are susceptible to electrical noise generated by the outside environment or other components during vehicle operation. Such electrical noise could be read and falsely perceived by the engine controller as a pin position state change which, in turn, could lead to a diagnostic fault code being set and remedial action being inadvertently performed. Thus, there is a need for a reliable means of noise filtering a sliding camshaft actuator pin position output signal to prevent false feedback to the engine controller.

BRIEF SUMMARY

One or more exemplary embodiments address the above issue by providing a method of noise filtering a sliding camshaft actuator pin position output signal.

According to an aspect of an exemplary embodiment, a method of noise filtering a sliding camshaft actuator pin position output signal includes determining an actual pin position output signal period of a sliding camshaft actuator that occurs within a predetermined output signal period measurement window. Still another aspect according to the exemplary embodiment includes establishing a pin position output signal filter window based on the actual pin position output signal period. And another aspect includes monitoring the actual pin position output signal period from the sliding camshaft actuator. And yet another aspect of the exemplary embodiment includes rejecting signals that occur outside of the pin position output signal filter window.

Still another aspect of the exemplary embodiment wherein determining an actual pin position output signal period of a sliding camshaft actuator that occurs within a predetermined output signal period measurement window further includes establishing the predetermined output signal period measurement window based on a predetermined nominal output signal period and a percentage of the predetermined nominal output signal period. And another aspect wherein establishing a pin position output signal filter window based on the actual pin position output signal period further includes increasing the actual pin position output signal period by a predetermined percentage of the actual pin position output signal period. And a further aspect wherein monitoring the actual pin position output signal period from the sliding camshaft actuator further includes reading a pulse width modulated signal output from a Hall Effect sensor of the sliding camshaft actuator. Yet a further aspect includes monitoring the actual pin position output signal period using a control module. And still another aspect in accordance with the embodiment wherein rejecting signals that occur outside of the pin position output signal filter window further includes filtering out signals occurring before the start, or after the end, of the pin position output signal filter window. And yet another aspect wherein rejecting further includes filtering out signals occurring within the pin position output signal filter window and having a duty cycle less than or greater than a predetermined percentage of a 100 percent duty cycle.

Another aspect in accordance with the exemplary embodiment wherein establishing the predetermined output signal period measurement window further includes adjusting the predetermined nominal output signal period based on temperature. And another aspect includes mitigating occurrences of setting false diagnostic codes by rejecting signals that occur outside of the pin position output signal filter window.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
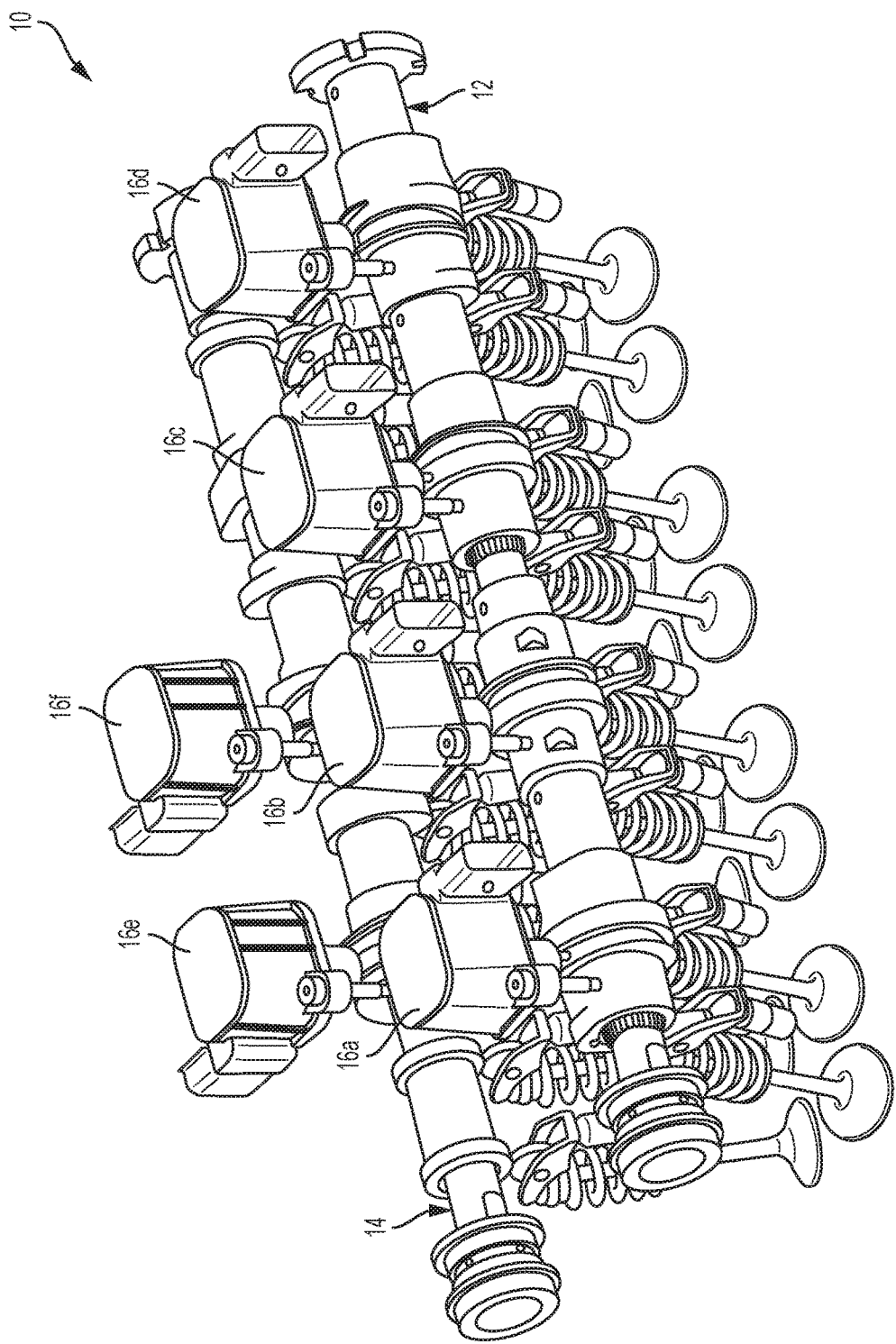
FIG. 1 is an illustration of an intake and an exhaust sliding camshaft configuration for a 4 cylinder internal combustion engine in accordance with aspects of an exemplary embodiment.

In accordance with the disclosed embodiment, FIG. 1 is an illustration of an intake and an exhaust sliding camshaft configuration for a 4 cylinder internal combustion engine camshaft system 10 in accordance with aspects of an exemplary embodiment. It is appreciated that the 4 cylinder embodiment is merely exemplary and the concept of sliding camshaft barrel position sensing may be applied to other multiple cylinder engine camshaft system configurations, e.g., 5, 6, 8, 9, or 12, without exceeding the scope of the invention.

The camshaft system 10 includes at least one sliding camshaft having at least one camshaft barrel. In the case, the camshaft system 10 includes a three (3) step intake sliding camshaft 12 and a two (2) step exhaust sliding camshaft 14. For shifting the position of the three step intake 12 and two step exhaust 14 sliding camshafts, at least one camshaft actuator 16 is provided in selective communication to the camshafts and commanded on and off by a control module, e.g., engine control module (not shown). Particular to this embodiment, camshaft system 10 includes a plurality of actuators (16a-16f) with actuators (16a-16d) being operative for shifting the three step intake sliding camshaft 12, and actuators (16e-16f) being operative for shifting the two step exhaust sliding camshaft 14 when commanded by the controller.

Figure 2:
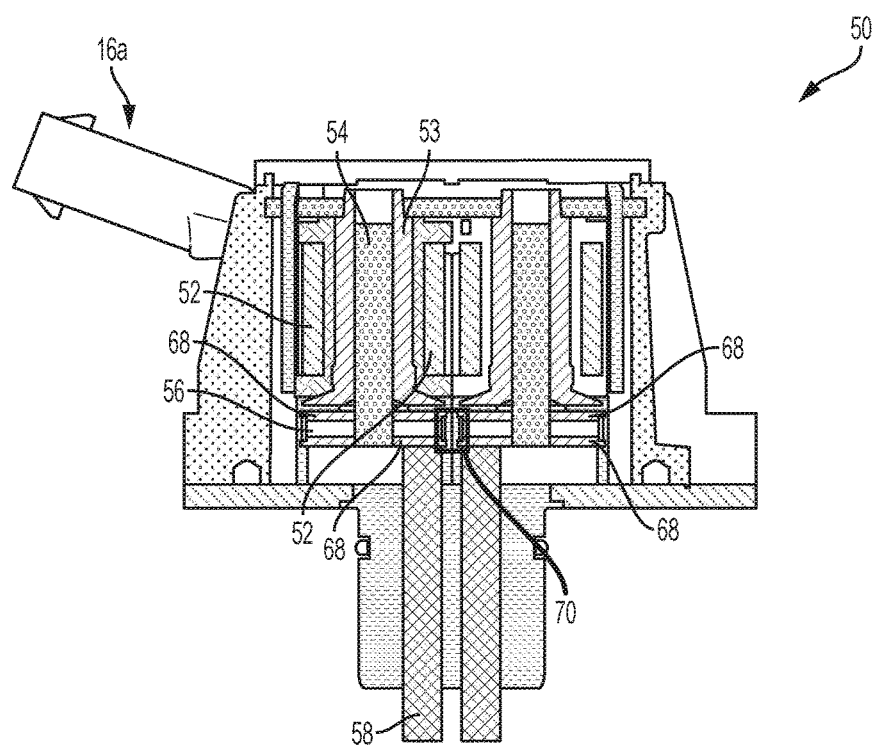
FIG. 2 is an illustration of a cross sectional view of a sliding camshaft actuator in accordance with aspects of the exemplary embodiment.

Referring now to FIG. 2, an illustration 50 of a cross sectional view of a sliding camshaft actuator (16a) is provided in accordance with aspects of the exemplary embodiment. The sliding camshaft actuator 16a includes a first magnetic field generating coil 52 wound on a spool 53 that shrouds a sliding armature 54 within its core. A magnet 56 is disposed between metal plates 68 and fixed at a bottom end of the sliding armature 54. The first magnetic field generating coil 52, the sliding armature 54, and magnet 56 are operative to cause a first actuator pin 58 to be extended into a camshaft barrel as necessary for purposes of shifting the position of the three step intake sliding camshaft 12 in accordance with aspects of the exemplary embodiment. A pin position sensing device 70, preferably a Hall Effect sensor, is provided for tracking the position of the actuator pin(s) and outputting a digital signal indicative of the pin position to a control module, i.e., engine control module (not shown).

It is appreciated that the output signal from the pin position sensing device 70 may be susceptible to electrical noise generated by the vehicle outside environment, pin actuating element itself, or other components on the vehicle during operation. Such electrical noise could be read and falsely perceived by the engine control module as a pin position state change which, in turn, could lead to a diagnostic fault code being set and a remedial action being inadvertently performed.

Figure 3:
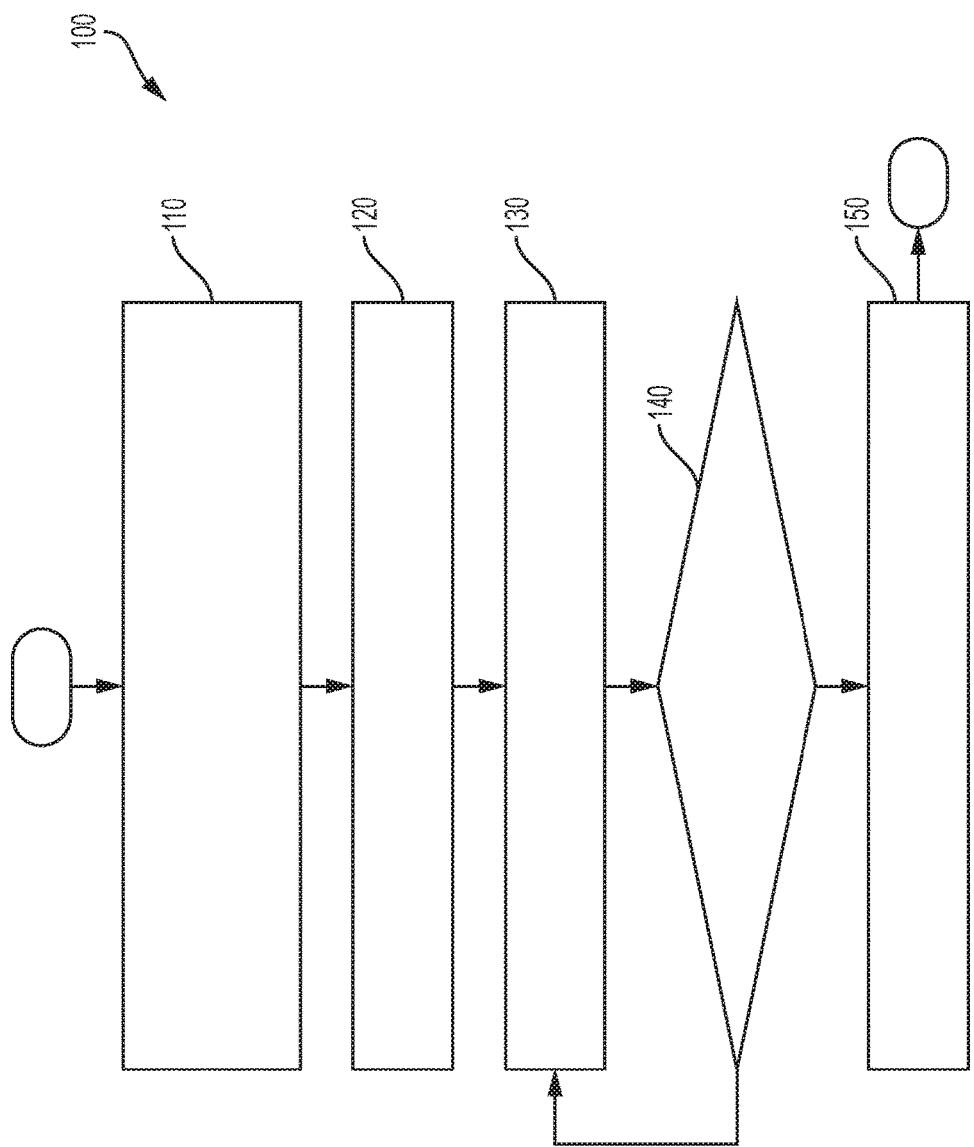
FIG. 3 is an illustration of an algorithm for a method of noise filtering a sliding camshaft actuator pin position output signal in accordance with the exemplary embodiment.

Referring now to FIG. 3, an illustration of an algorithm 100 for a method of noise filtering a sliding camshaft actuator pin position output signal in accordance with the exemplary embodiment is provided. It is appreciated the algorithm for a method of noise filtering a sliding camshaft actuator pin position output signal is operative to mitigate or prevent false diagnostic fault codes being set and a remedial action being inadvertently performed in response to the engine control module receiving false feedback from the pin position sensing device 70.

At block 110, the method begins with determining an actual pin position output signal period of a sliding camshaft actuator that occurs within a predetermined output signal period measurement window. Establishing the predetermined output signal period measurement window is based on a predetermined nominal output signal period and a percentage of the predetermined nominal output signal period. For example, a predetermined nominal output signal period may be 500 ms, and 20% of 500 ms is 100 ms. Thus, the predetermined output signal period measurement window would be established by adding +/−100 ms to the maximum and minimum limits of the 500 ms nominal period to get a total measurement window of 400 ms to 600 ms.

Next, at block 120, the method continues with establishing a pin position output signal filter window based on the actual pin position output signal period. Establishing the pin position output signal filter window based on the actual pin position output signal period further includes increasing the actual pin position output signal period by a predetermined percentage of the actual pin position output signal period. In accordance with the exemplary embodiment, an actual pin position output signal period may be 450 ms and a predetermined percentage, e.g., 5%, of the actual pin position output signal period would be 22.5 ms. Thus, the pin position output signal filter window would be decreased to 45 ms (+/−22.5 ms added to the upper and lower limits) to obtain a filter window of 427.5 ms to 475.5 ms.

At block 130, the method continues with monitoring the actual pin position output signal period being output from the sliding camshaft actuator's Hall Effect sensor in accordance with the exemplary embodiment. It is appreciated that other types of position detection sensing devices suitable for sensing the actuator pin position may be used for without exceeding the scope of the disclosure. The output of the sensing device is read by a control module to determine whether the actuator pin position changes appropriately in response to VVL commands. If a pin's position does not change in response to VVL command then a fault code will be set and/or a remedial action, e.g., maintain current VVL status until vehicle service, may be triggered.

Next, at block 140, the method continues with determining if the sensing device output signal is outside of the pin position output signal filter window, or if the sensing device output signal occurring within the pin position output signal filter window has a duty cycle less than or greater than a predetermined percentage of a 100 percent duty cycle. If the sensing device output signal is outside of the pin position output signal filter window, or if the sensing device output signal occurring within the pin position output signal filter window has a duty cycle less than a predetermined percentage, e.g., 10% of a 50% duty cycle or greater than a predetermined percentage e.g., 90% of a 80% duty cycle then, at block 150, the method continues with rejecting signals these signals such a false triggers do not cause the control module to inadvertently perform remedial actions or set false codes in accordance with the exemplary embodiment. If the sensing device output signal is not outside of the pin position output signal filter window then the method returns to block 130 to continue the method until the engine is turned off.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of noise filtering a sliding camshaft actuator pin position output signal comprising:
    determining an actual pin position output signal period of a sliding camshaft actuator that occurs within a predetermined output signal period measurement window;
    establishing a pin position output signal filter window based on the actual pin position output signal period;
    monitoring the actual pin position output signal period from the sliding camshaft actuator; and
    rejecting signals that occur outside of the pin position output signal filter window.

2. The method of claim 1 wherein establishing further comprises increasing the actual pin position output signal period by a predetermined percentage of the actual pin position output signal period.

3. The method of claim 1 wherein rejecting further comprises filtering out signals occurring before the start, or after the end, of the pin position output signal filter window.

4. The method of claim 1 wherein rejecting further comprises filtering out signals occurring within the pin position output signal filter window and having a duty cycle less than or greater than a predetermined percentage of a 100 percent duty cycle.

5. The method of claim 1 further comprising mitigating occurrences of setting false diagnostic codes by rejecting signals that occur outside of the pin position output signal filter window.

6. The method of claim 1 wherein determining further comprises establishing the predetermined output signal period measurement window based on a predetermined nominal output signal period and a percentage of the predetermined nominal output signal period.

7. The method of claim 6 wherein establishing the predetermined output signal period measurement window further comprises adjusting the predetermined nominal output signal period based on temperature.

8. The method of claim 1 wherein monitoring further comprises reading a pulse width modulated signal output from a Hall Effect sensor of the sliding camshaft actuator.

9. The method of claim 8 further comprising monitoring the actual pin position output signal period using a control module.

10. A method of noise filtering a sliding camshaft actuator pin position output signal comprising:
    establishing a predetermined output signal period measurement window based on a predetermined nominal output signal period and a percentage of the predetermined nominal output signal period;
    determining an actual pin position output signal period of a sliding camshaft actuator that occurs within the predetermined output signal period measurement window;
    establishing a pin position output signal filter window based on the actual pin position output signal period;
    monitoring the actual pin position output signal period from the sliding camshaft actuator; and
    rejecting signals that occur outside of the pin position output signal filter window.

11. The method of claim 10 wherein monitoring further comprises reading a pulse width modulated signal output from a Hall Effect sensor of the sliding camshaft actuator.

12. The method of claim 10 wherein rejecting further comprises filtering out signals within the pin position output signal filter window and having a duty cycle less than or greater than a predetermined percentage of a 100 percent duty cycle.

13. The method of claim 10 wherein establishing the predetermined output signal period measurement window further comprises adjusting the predetermined nominal output signal period based on temperature.

14. The method of 10 mitigating occurrences of setting false diagnostic codes by rejecting signals that occur outside of the pin position output signal filter window.

15. The method of claim 10 wherein establishing the pin position output signal filter window further comprises increasing the actual pin position output signal period by a predetermined percentage of the actual pin position output signal period.

16. The method of claim 15 further comprising monitoring the actual pin position output signal period using a control module.

17. A method of noise filtering a sliding camshaft actuator pin position output signal comprising:
    establishing a predetermined output signal period measurement window based on a predetermined nominal output signal period and a percentage of the predetermined nominal output signal period;
    determining an actual pin position output signal period of a sliding camshaft actuator that occurs within the predetermined output signal period measurement window;
    establishing a pin position output signal filter window based on the actual pin position output signal period;
    monitoring the actual pin position output signal period from the sliding camshaft actuator;
    rejecting signals that occur outside of the pin position output signal filter window, or within the pin position output signal filter window and having a duty cycle less than or greater than a predetermined percentage of a 100 percent duty cycle; and
    mitigating occurrences of setting false diagnostic codes by rejecting signals that occur outside of the pin position output signal filter window.

18. The method of claim 17 wherein monitoring further comprises reading a pulse width modulated signal output from a Hall Effect sensor of the sliding camshaft actuator.

19. The method of claim 17 wherein establishing the pin position output signal filter window further comprises increasing the actual pin position output signal period by a predetermined percentage of the actual pin position output signal period.

20. The method of claim 19 further comprising monitoring the actual pin position output signal period using a control module.

* * * * *